United States Patent
Nakahama et al.

(10) Patent No.: US 7,583,224 B2
(45) Date of Patent: Sep. 1, 2009

(54) RADAR APPARATUS WITH AUTOMATIC LOCAL OSCILLATOR TUNING FUNCTION

(75) Inventors: Masahiro Nakahama, Nishinomiya (JP); Yoshihiro Ishii, Nishinomiya (JP); Katsuyuki Yanagi, Nishinomiya (JP); Koji Dai, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 104 days.

(21) Appl. No.: 11/808,725

(22) Filed: Jun. 12, 2007

(65) Prior Publication Data

US 2008/0122684 A1    May 29, 2008

(30) Foreign Application Priority Data

Jun. 13, 2006 (JP) ............... 2006-163913

(51) Int. Cl.
*G01S 7/40* (2006.01)
*G01S 7/285* (2006.01)

(52) U.S. Cl. .................. 342/100; 342/98; 342/174; 342/196; 342/199

(58) Field of Classification Search ........... 342/98–101, 342/115, 159, 173, 174, 195, 196, 199
See application file for complete search history.

(56) References Cited

U.S. PATENT DOCUMENTS

| | | | | |
|---|---|---|---|---|
| 2,684,478 A | * | 7/1954 | Fox | 342/100 |
| 3,953,849 A | * | 4/1976 | Couvillon | 342/100 |
| 4,600,924 A | * | 7/1986 | Lobsinger et al. | 342/98 |
| 5,151,703 A | * | 9/1992 | Roos | 342/199 |
| 5,224,075 A | | 6/1993 | Iino et al. | |
| 5,654,716 A | | 8/1997 | Donovan et al. | |
| 5,736,956 A | * | 4/1998 | Kennedy et al. | 342/90 |
| 6,127,962 A | * | 10/2000 | Martinson | 342/20 |
| 6,151,369 A | * | 11/2000 | Ohkubo et al. | 375/332 |
| 6,154,166 A | * | 11/2000 | Sawada et al. | 342/20 |

* cited by examiner

*Primary Examiner*—Thomas H Tarcza
*Assistant Examiner*—Cassi Galt
(74) *Attorney, Agent, or Firm*—Birch, Stewart, Kolasch & Birch, LLP

(57) ABSTRACT

The portion corresponding to a main bang signal leaking from a transmission/reception switching unit is extracted as a frequency estimation signal from an IF signal from a mixer in a signal extracting unit, a frequency is estimated in a frequency estimating unit, and the frequency of a local oscillation signal of a local oscillator is controlled so that the frequency of the IF signal is equal to a target value. The frequency estimation in the frequency estimating unit is carried out by using Discrete Fourier Transform or Fast Fourier Transform.

10 Claims, 9 Drawing Sheets

FIG. 8A  *Prior Art*
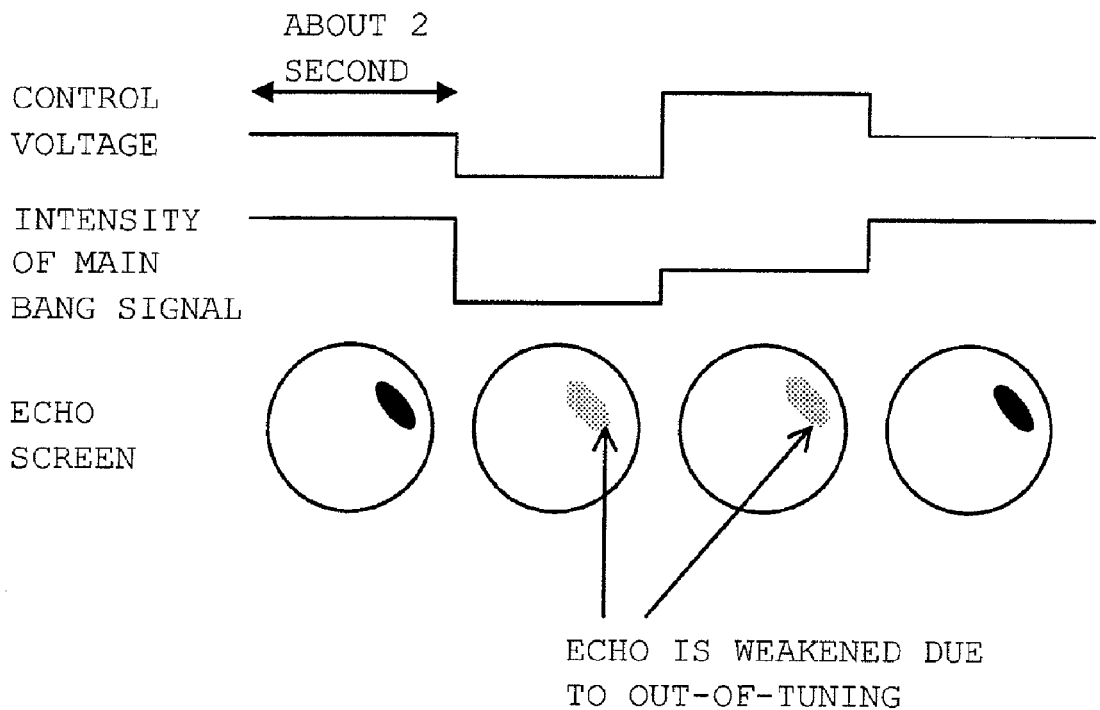
ECHO IS WEAKENED DUE TO OUT-OF-TUNING
FIG. 8B  *Prior Art*
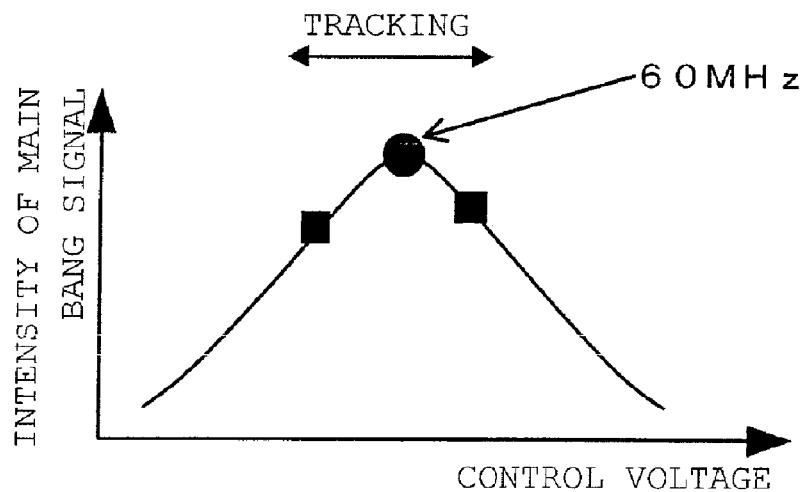

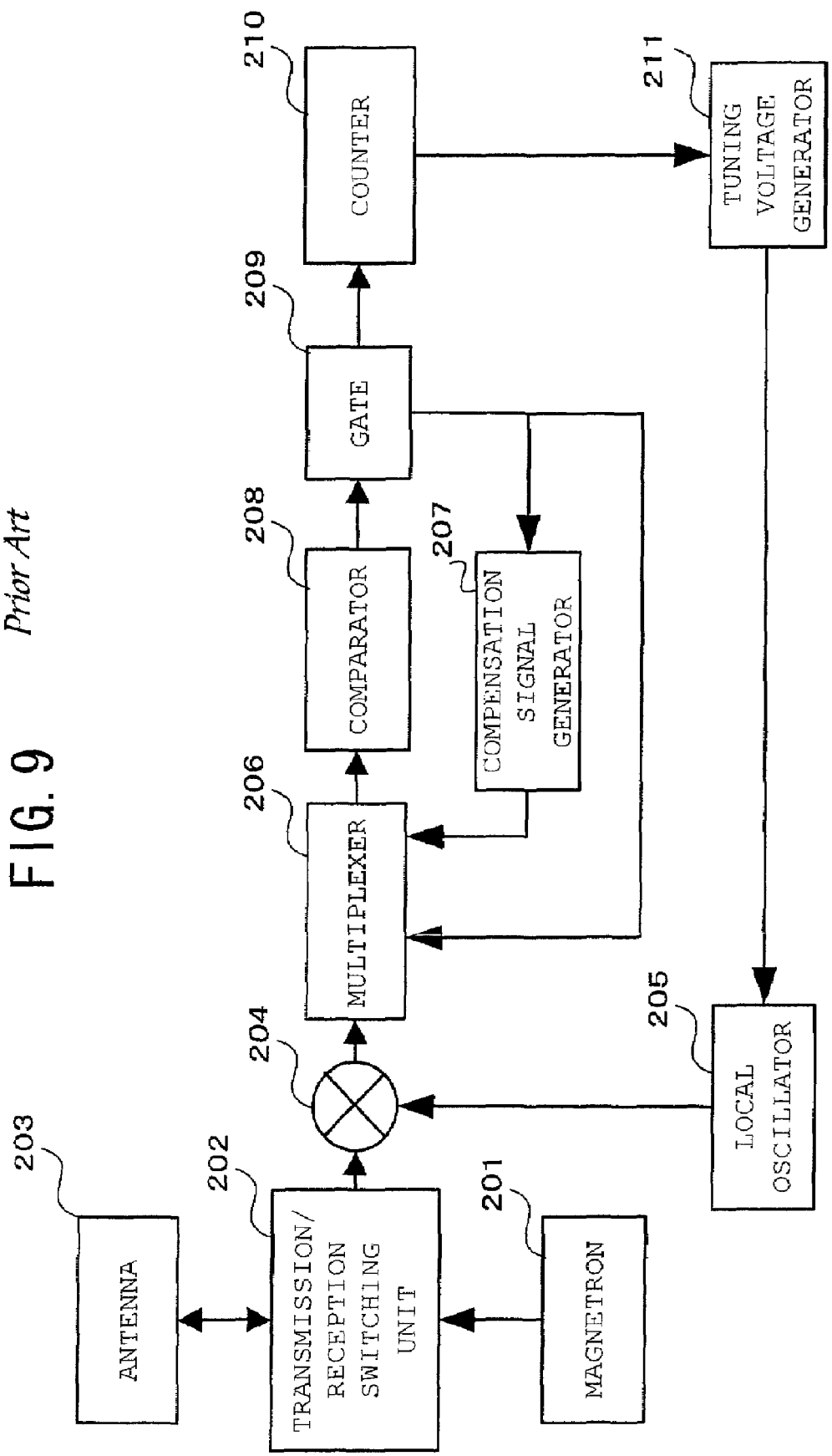
FIG. 9  *Prior Art*

RADAR APPARATUS WITH AUTOMATIC LOCAL OSCILLATOR TUNING FUNCTION

BACKGROUND OF THE INVENTION

1. Field of the Invention

The present invention relates to a radar apparatus having an automatic tuning function.

2. Description of the Related Art

A magnetron has been frequently used as an oscillator for a radar apparatus equipped to boats and ships, etc., however, the oscillation frequency of the magnetron is generally unstable in many cases. When the oscillation frequency of the magnetron varies, the frequency of a reflection signal from a target also varies, and thus an excellent radar picture cannot be achieved.

A radar apparatus having an automatic tuning function as shown in FIG. 7 is known as a radar apparatus which can solve the problem as described above.

FIG. 7 shows a conventional radar apparatus. In FIG. 7, a pulse signal generated in a magnetron 101 is transmitted through a transmission/reception switching unit 102 to an antenna 103 in response to a transmission trigger, and irradiated to a detection area as electromagnetic waves. An echo signal reflected from a target is received by the antenna 103, passed through the transmission/reception switching unit 102, and then combined with a local oscillation signal from a local oscillator 105 to be converted to an IF signal (a signal in an intermediate frequency band) by a mixer 104. A local oscillator whose oscillation frequency is variable by changing a control voltage to be applied is used as the local oscillator 105.

An IF signal output from the mixer 104 is transmitted through an amplifier 106, a band filter 107 and a wave detector 108 to a main bang signal extracting unit 109. The main bang signal means a signal generated when a part of a pulse signal generated in the magnetron 101 leaks to the reception system through the transmission/reception switching unit 102 by reflection or the like without being irradiated from the antenna 103 to the air. In the main bang extracting unit 109, the main bang signal is extracted from the input signal, and input to an envelope peak detector 111. In the envelope peak detector 111, the peak value of the intensity of the input main bang signal is accumulated over the detecting operation of the radar which is executed at plural times while the control voltage applied to the local oscillator 105 is successively changed. In this case, the control voltage of the local oscillator 105 with which the peak value of the intensity of the main bang signal is maximum is determined, and then the determined control voltage is applied to the local oscillator 105 when the subsequent transmission operation is carried out. The signal other than the main bang signal is transmitted as a video signal to a display unit 110, and a detection image is displayed on the display unit 110.

FIGS. 8A and 8B are diagrams showing an aspect (tuning operation) that the control voltage applied to the local oscillator 105 is changed every transmission. Under radar operation, the tuning processing as described above is automatically executed periodically. As shown in FIGS. 8A and 8B, the control voltage applied to the local oscillator 105 is slightly varied upwardly and downwardly (tracking) at a period of two seconds, thereby determining the control voltage under which the peak value of the main bang signal is maximum.

Furthermore, U.S. Pat. No. 5,654,716 (Patent Document 1) discloses a radar apparatus based on a different system from the foregoing device.

According to this radar apparatus, the number of waves of a signal whose frequency is required to be detected is counted for a fixed time, and the thus-achieved count value is compared with the number of waves of a reference signal which is counted for the same time, thereby estimating the value of the frequency.

FIG. 9 schematically shows the radar apparatus disclosed in the Patent Document 1.

As shown in FIG. 9, an IF signal output from a mixer 204 and a reference signal generated by a compensation signal generator 207 are input to a comparator 208 through a multiplexer 206, and the respective signals are shaped into rectangular waves. Thereafter, each of the IF signal and the reference signal converted to the respective rectangular waves is cut out for a fixed time by a gate 209, and the number of the cut-out waves of each signal is counted by a counter 210. In the radar apparatus disclosed in Patent Document 1, the numbers of the respective waves of the IF signal and the reference signal which are counted over the same time period are compared with each other to estimate the frequency of the IF signal, and the voltage applied to the local oscillator 205 is controlled by a tunable voltage generator 211 so that the frequency of the IF signal is coincident with a predetermined target value.

In the radar apparatus shown in FIG. 7, it is required to upwardly and downwardly change (increase and reduce) the voltage applied to the local oscillator 105 when a voltage applied to the local oscillator 105 under which the peak value of the intensity of the main bang signal is maximum is determined. Therefore, when the above processing is executed under the state that the tuning has been already established, the applied voltage is changed so that the frequency is out of tuning, so that the detection image is disturbed (see FIG. 8A). Furthermore, the maximum value of the peak value of the intensity of the main bang signal is not known unless the applied voltage is changed upwardly and downwardly, and thus it is impossible to judge in advance whether tuning has been already established or not.

Furthermore, in the radar apparatus disclosed in Patent Document 1, the IF signal and the reference signal which are converted to the rectangular waves are cut out for a fixed time and compared with each other. Therefore, the high-precision compensation signal generator for generating the reference signal and the high-precision gate 209 for accurately cutting out the rectangular wave for a fixed time are required, however, all these units are expensive. Furthermore, in order to enhance the precision of the detection frequency, the sampling frequency is increased and averaging is required, so that it takes much time to execute the processing and thus it is difficult to follow the quick frequency variation of the magnetron.

SUMMARY OF THE INVENTION

The present invention has been implemented in view of the foregoing situation, and has an object to solve the above problems and provide a radar apparatus that can automatically perform tuning without disturbing a detection image and follow quick frequency variation of a magnetron.

In order to attain the above object, a radar apparatus according to a first aspect of the present invention includes: an antenna for transmitting electromagnetic waves and receiving reflection waves from a target; a transmission/reception switching unit for supplying a high-frequency signal from a magnetron to the antenna and outputting a signal from the antenna; a mixer for mixing a signal output from the transmission/reception switching unit with a local oscillation signal generated in a local oscillator and outputting an IF signal of an intermediate frequency band; a band pass filter for filtering the IF signal; a detector for detecting a signal output from the band pass filter and outputting a detection signal; an A/D converter for converting the IF signal and the detection signal to digital signals; a display processor for processing the detection signal output from the A/D converter and displaying a detection picture of the target; a frequency estimating unit for estimating the frequency value of a carrier signal corresponding to main bang out of the IF signal output from the A/D converter by Fourier Transform; and a frequency controller for controlling a control voltage applied to the local oscillator on the basis of the frequency estimated in the frequency estimating unit so that the frequency of the IF signal output from the mixer approaches to a predetermined target frequency.

According to the above construction, there can be implemented the radar apparatus that can perform automatic tuning without disturbing the detection image.

Furthermore, the above radar apparatus of the present invention may further include a multiplexer for time-divisionally selecting a detection signal output from the wave detector and a non-detected IF signal output from the mixer, and outputting the selected signal to the A/D converter, and a signal extracting unit for extracting the signal corresponding to the main bang from the output of the A/D converter, outputting the extracted signal to the frequency estimating unit and outputting the remaining signal or the output of the A/D converter to the display processor so that the IF signal and the detection signal are converted to digital signals by one A/D converter.

According to the above construction, the IF signal and the detection signal can be subjected to A/D conversion by one A/D converter, and thus the cost can be suppressed.

Still furthermore, a radar apparatus according to a second aspect of the present invention includes: an antenna for transmitting electromagnetic waves and receiving reflection waves from a target; a transmission/reception switching unit for supplying a high-frequency signal from a magnetron to the antenna and outputting a signal from the antenna; a mixer for mixing a signal output from the transmission/reception switching unit with a local oscillation signal generated in a local oscillator and outputting an IF signal of an intermediate frequency band; a band pass filter for filtering the IF signal; a wave detector for detecting a signal output from the band pass filter and outputting a detection signal; an A/D converter for converting the IF signal and the detection signal to digital signals; a display processor for processing the detection signal output from the A/D converter and displaying the detection picture of the target; a signal switching unit for selectively outputting the detection signal and the IF signal output from the A/D converter on the basis of a predetermined condition; a video peak detector for receiving the detection signal output from the A/D converter, successively detecting and storing the intensity of the signal corresponding to main bang in the detection signal over plural transmission/reception cycles that are executed while successively changing a control voltage applied to the local oscillator, determining a control voltage applied to the local oscillator under which the intensity concerned is maximum, and outputting the control voltage concerned to a frequency controller; a frequency estimating unit for receiving the IF signal output from the A/D converter, and estimating the frequency value of a carrier signal corresponding to main bang in the IF signal; and the frequency controller for controlling the control voltage applied to the local oscillator on the basis of the control voltage of the local oscillator detected by the video peak detector or the frequency estimated in the frequency estimating unit so that the frequency of the IF signal output from the mixer approaches to a predetermined target frequency.

According to the above construction, there can be implemented the radar apparatus that can perform automatic tuning without disturbing the detection image.

Furthermore, in the radar apparatus of the present invention, the signal switching unit may output the detection signal output from the A/D converter by when power is turned on, or when frequency estimated by the frequency estimating unit is out of a first frequency range, or when the variation amount of the estimated frequency is over a predetermined permitted range after power is turned on.

According to the above construction, there can be implemented the radar apparatus that can perform the automatic tuning more surely.

Still furthermore, in the above radar apparatus, when the vide peak detector determines the control voltage under which the intensity of the signal corresponding to the main bang in the detection signal is maximum, the signal switching unit may switch the output thereof from the detection signal to the IF signal.

According to the above construction, there can be implemented the radar apparatus that can more surely perform the automatic tuning.

Still furthermore, the above radar apparatus of the present invention may further include a multiplexer for time-divisionally selecting a detection signal output from the detector and a non-detected IF signal output from the mixer, and outputting the selected signal to the A/D converter, and a signal extracting unit for extracting the signal corresponding to the main bang from the output of the A/D converter, outputting the extracted signal to the signal switching unit and outputting the remaining signal or the output of the A/D converter to the display processor so that the IF signal and the detection signal are converted to digital signals by one A/D converter.

According to the above construction, the IF signal and the detection signal can be subjected to A/D conversion by one A/D converter, and thus the cost can be suppressed.

In the above radar apparatus of the present invention, the frequency controller may be designed so that the control voltage applied to the local oscillator is not varied when the frequency value from the frequency estimating unit is contained in a second frequency range in the neighborhood of the target frequency.

According to the above construction, there can be implemented the radar apparatus that can more surely perform the automatic tuning.

Furthermore, in the above radar apparatus of the present invention, the frequency controller may correct the target frequency on the basis of the frequency of the IF signal under application of the control voltage of the local oscillator that provides the maximum value to the intensity of the signal corresponding to the main bang in the detection signal and is detected by the video peak detector.

According to the above construction, there can be implemented the radar apparatus that can more surely perform the automatic tuning.

Still furthermore, in the above radar apparatus of the present invention, the frequency controller may calibrate the relationship between the control voltage of the local oscillator and the oscillation frequency on the basis of the frequency estimated by the frequency estimating unit when a different control voltage is applied to the local oscillator.

According to the above construction, there can be implemented the radar apparatus that can more surely perform the automatic tuning.

Still furthermore, in the above radar apparatus of the present invention, the frequency estimating unit may estimate the frequency on the basis of the maximum spectrum achieved by subjecting a carrier signal corresponding to main bang in the IF signal to Discrete Fourier Transform and spectra in the neighborhood of the maximum spectrum.

According to the above construction, the frequency estimation of the frequency estimation signal can be perform with higher precision.

In the above radar apparatus of the present invention, the frequency estimating unit may output to the frequency controller a frequency value which is subjected to averaging processing over plural radar detecting operations.

According to the above construction, the frequency estimation value averaged over plural detection periods is achieved, and thus the effect of the minute variation of the oscillation frequency of the magnetron can be relaxed.

According to the present invention, there can be implemented the radar apparatus that can perform automatic tuning without disturbing the detection image.

BRIEF DESCRIPTION OF THE DRAWINGS

FIGS. 8A and 8B are diagrams showing a problem of a conventional technique; and

FIG. 9 is a block diagram showing another conventional radar apparatus.

DETAILED DESCRIPTION OF THE PREFERRED EMBODIMENTS

Preferred embodiments according to the present invention will be described.

First Embodiment

Figure 1:
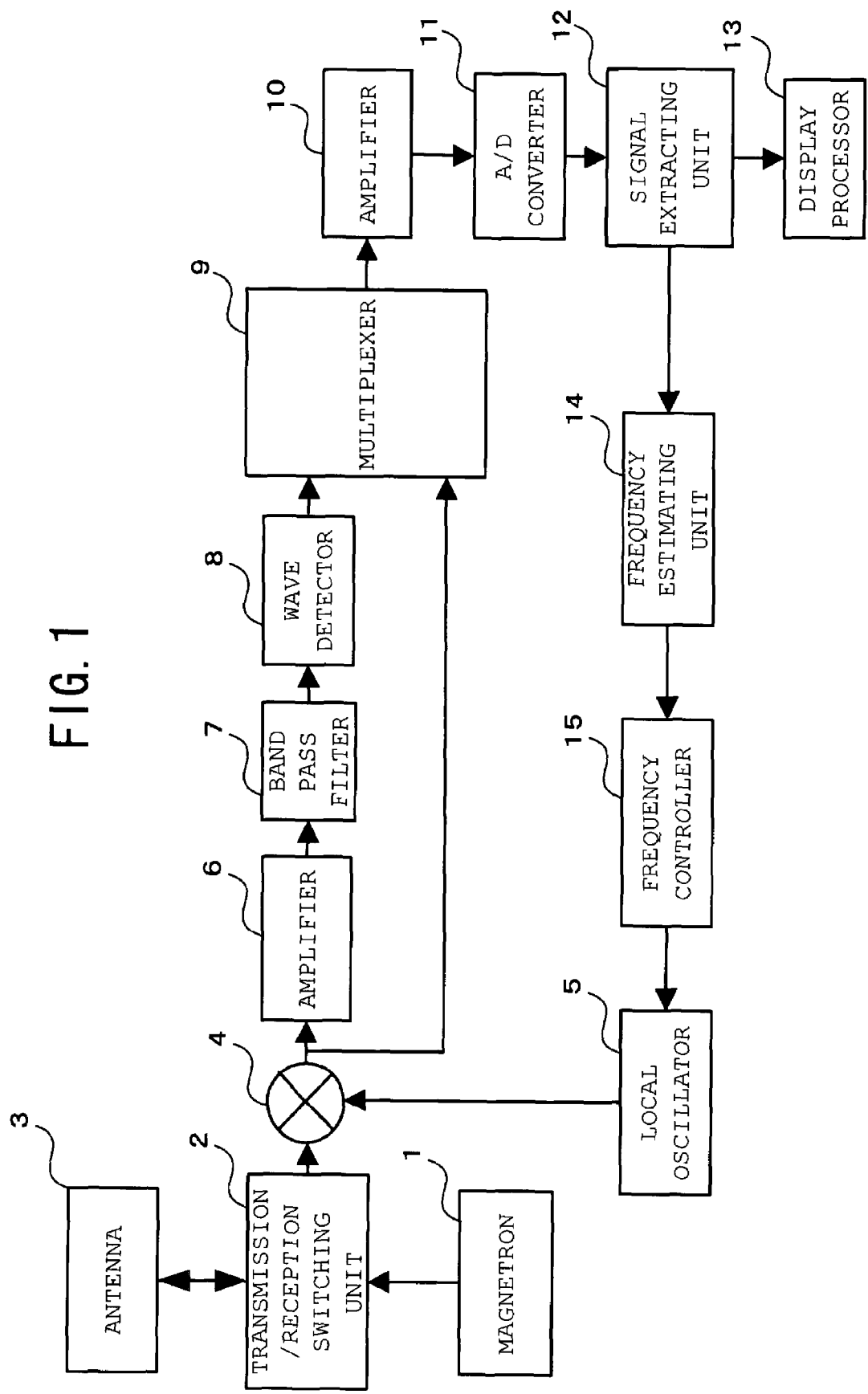
FIG. 1 is a block diagram showing a first embodiment of the present invention.
Figure 2:
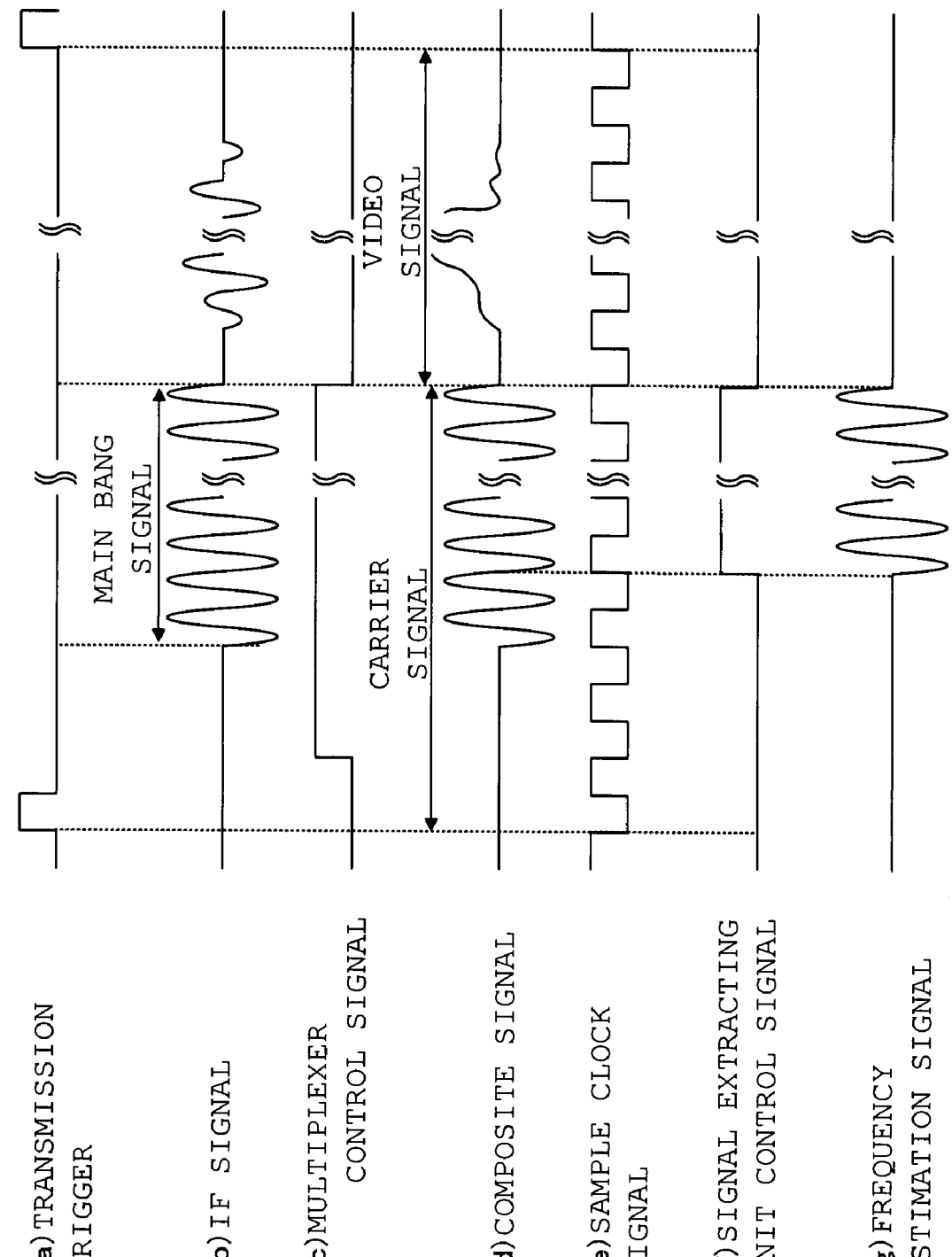
FIG. 2 shows signal waveforms of respective parts.

FIG. 1 is a block diagram showing a radar apparatus according to a first embodiment of the present invention, and FIG. 2 shows signal waveforms of respective parts.

In FIG. 1, a magnetron 1 for generating a high-frequency signal (for example, a high-frequency signal of about 9410 MHz) is connected to the antenna 3 through the transmission/reception switching unit 2 (circulator). Pulse-shaped electric waves are successively transmitted from the antenna 3 in each direction in synchronism with a transmission trigger ((a) of FIG. 2). The transmitted electric waves are reflected from a target existing at a position in the transmission direction of the electric waves, and received by the antenna 3. The reception signal received by the antenna 3 is guided through the transmission/reception switching unit 2 to a mixer 4, and combined with a local oscillation signal (for example, a signal of about 9470 MHz, for example) from a local oscillator 5 connected to the mixer 4 in the mixer 4, whereby an IF signal of an intermediate frequency band (in this case, a signal of about 60 MHz, (b) of FIG. 2) is output. As the oscillator 5 is used an oscillator whose oscillation frequency is controllable by adjusting a control voltage applied thereto (voltage Controlled Oscillator, hereinafter referred to as "VCO").

The IF signal output from the mixer 4 is split to two parts of two systems. One part of the IF signal is passed through an amplifier 6, a band bass filter 7 and a wave detector 8 to a multiplexer 9 (signal combining unit), and the other part is directly input to the multiplexer 9. In the band pass filter 7, the signals other than signals having frequencies in the neighborhood of a frequency band which a display signal should have (in this case, signals of about 60 MHz) are removed. The multiplexer 9 is controlled by a control signal ((c) of FIG. 2) synchronized with the transmission trigger, and generates a composite signal ((d) of FIG. 2) comprising a portion (carrier signal) of the IF signal which is not detected and corresponds to a main bang signal, and the other portion (video signal) of the IF signal which is detected and corresponds to the signal other than the main bang signal, the former portion and the latter portion being time-divisionally combined with each other. The composite signal is amplified in the amplifier 10, sampled with a predetermined sampling clock signal ((e) of FIG. 2) in a subsequent A/D converter 11 and then converted to a digital signal. Thereafter, the digitalized composite signal is cut out and divided into a frequency estimation signal ((g) of FIG. 2) as the digital signal corresponding to a main bang signal and a display signal as the digital signal corresponding to the signal other than the main bang signal again in a signal extracting unit 12. A control signal for controlling a time interval at which the frequency estimation signal is cut out in the signal extracting unit 12 is shown in (f) of FIG. 2.

In the signal extracting unit 12, the time interval for cutting out the frequency estimation signal is set to be slightly shorter than the length of the main bang signal so that noises caused by the switching operation of the multiplexer 9 are prevented from being contaminated into the frequency estimation signal. The frequency estimation signal thus achieved is input to a frequency estimating unit 14. On the other hand, the display signal is processed in a display processor 13, and the detection picture of the target is displayed.

The signal extracting unit 12 may be designed so that the data corresponding to the input signal are temporarily stored in a memory, the data corresponding to the main bang signal is output to the frequency estimating unit 14, and the data corresponding to the signal other than the main bang signal is output as the display signal to the display processor 13. A signal containing the main bang signal portion may be used as the display signal.

The processing of estimating the frequency of the frequency estimation signal is executed in the frequency estimating unit 14. In the frequency estimating unit 14, the frequency estimation signal is subjected to signal processing such as DFT (Discrete Fourier Transform) or FFT (Fast Fourier Transform) which is one type of DFT and corresponds to the processing achieved by speeding up DFT, whereby the frequency estimation signal is converted to a signal in a frequency region. Thereafter, the frequency value having the maximum value in the frequency region is determined, and it is output as the frequency value of the frequency estimation signal to the subsequent frequency controller 15.

Next, a frequency estimating method in the frequency estimating unit 14 will be described.

In the frequency estimating unit 14, the frequency at which the spectral intensity in the frequency region of the frequency estimation signal is maximum may be directly output as an estimated frequency of the frequency estimation signal. However, in order to estimate the frequency with high precision, the frequency may be estimated by using the data of the frequency providing the maximum spectral intensity in the frequency region and data of frequencies in the neighborhood of the above frequency. This method corresponds to a frequency estimating method used in an underwater sound field. This method is also called as "Tabei and Ueda method", and disclosed in detail in U.S. Pat. No. 5,224,075.

Furthermore, the frequency estimating unit 14 may be designed so that the frequencies achieved over plural radar transmission/reception operations are accumulated and subjected to averaging processing to achieve an average frequency and then the average frequency is output to the frequency controller 15. In this case, if there are frequency data having unexpected unnatural numerical values, the averaging processing may be executed after these frequency data are properly removed.

In place of the processing of achieving frequencies over several radar transmitting operations and then averaging the achieved frequencies, there may be used the processing of accumulating time-region based signals input to the frequency estimating unit 14 over several radar transmitting operations in the frequency estimating unit 14, adding the respective data of the signals at the same sampling time to create a data sequence in the time region and then subjecting the data sequence to the Fourier Transform processing to estimate the frequency. This is the processing using the linearity of Fourier Transform. For example when the average value of frequencies of the frequency estimation signal over ten radar transmitting operations is determined, the averaging processing load imposed on the processing of accumulating data sequences of the frequency estimation signal over the ten radar transmitting operations, adding the respective data at the same timing to create a data sequence, and then subjecting the data sequence to the Fourier Transform processing once to estimate the frequency is substantially equal to one tenth of the averaging processing load imposed on the processing of subjecting a data sequence of the frequency estimation signal to the Fourier Transform processing to estimate a frequency every radar transmitting operation and repeating this operation over ten radar transmitting operations to determine the average value of the ten frequency values. Accordingly, the above processing is more efficient.

In the foregoing description, DFT or FFT corresponding to the processing achieved by speeding up DFT is executed in the frequency estimating unit 14. In the calculation based on FFT, the calculation speed is higher than general DFT when a spectrum is achieved over the whole range of the frequency region. On the other hand, in the calculation based on general DFT without using FFT, data in the frequency region are output in order from lower frequencies till higher frequencies, and thus a spectrum in a desired frequency range can be selectively achieved. In case where a spectral distribution of the frequency estimation signal is limited to the vicinity of the target frequency value as in the case of the radar apparatus of this invention, the frequency estimating processing based on the general DFT would be rather higher in calculation speed than the processing based on FFT if the only the spectrum around the target frequency value is selectively achieved by the general DFT. Furthermore, the frequency estimated by the frequency estimating unit 14 may be stored and only the frequency components around the previously estimated frequency may be selectively determined at the next time.

The frequency estimating unit 14 may be designed so that the data in the time region of the frequency estimating signal is properly thinned out and then the frequency is estimated by using the thin-out signal.

Furthermore, the frequency estimating unit 14 may use a method of counting extreme values or zero-cross points of the frequency estimating signal to estimate the frequency of the same signal in place of the method based on Fourier Transform.

Next, the frequency controller 15 will be described.

Figure 3:
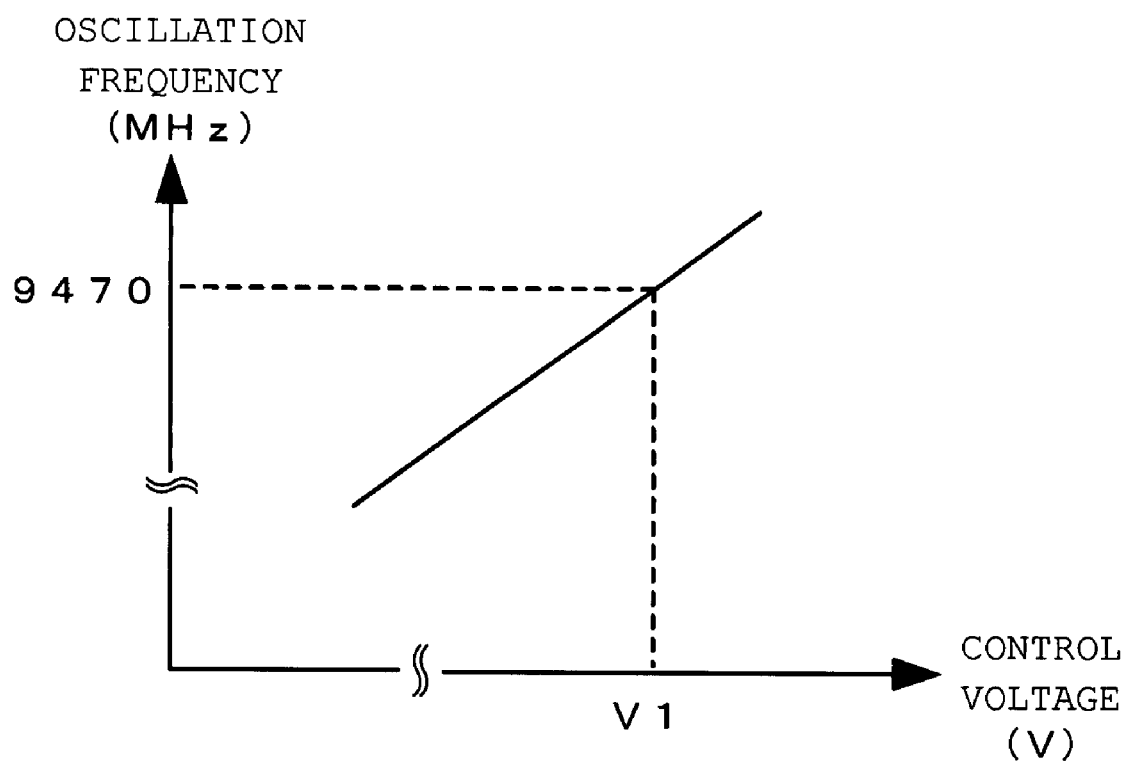
FIG. 3 shows a characteristic function of a control voltage and an oscillation frequency of a local oscillator.

The frequency value of the frequency estimation signal determined in the frequency estimating unit 14 is input to the frequency controller 15. The frequency controller 15 controls the control voltage applied to the local oscillator 5 on the basis of the input frequency value to adjust the frequency of the local oscillation signal generated in the local oscillator 5 so that the frequency of the IF signal output from the mixer 4 approaches to a target value (60 MHz in this example). VCO is used as the local oscillator 5. A characteristic as shown in FIG. 3 exists between the control voltage applied to VCO and the oscillation frequency, and the gradient of the tangent line in the vicinity of the use frequency range (about 9470 MHz in oscillation frequency in FIG. 3) of this characteristic function is stored in the frequency controller 15 in advance. The frequency controller 15 changes the control voltage applied to the local oscillator 5 on the basis of the gradient of the tangent line in the vicinity of the use frequency range of this characteristic function (hereinafter referred to as "gradient of VCO characteristic"), thereby controlling the oscillation frequency of the local oscillator 5. Specifically, for example, the difference between the target frequency and the estimated frequency is divided by the gradient of the VCO characteristic to achieve a voltage differential value, and the voltage differential value thus achieved is added to or subtracted from the previous control voltage. The resultant value is applied to the local oscillator 5.

The control voltage applied to the local oscillator 5 may be set to be unchangeable when the frequency of the frequency estimation signal input to the frequency controller 15 is within a desired target precision range (second frequency range), for example, in the range from 58 MHz to 62 MHz. Accordingly, it can be prevented that the radar apparatus excessively responds to the variation of the oscillation frequency of the magnetron 1 and thus the operation thereof is unstable.

Figure 4:
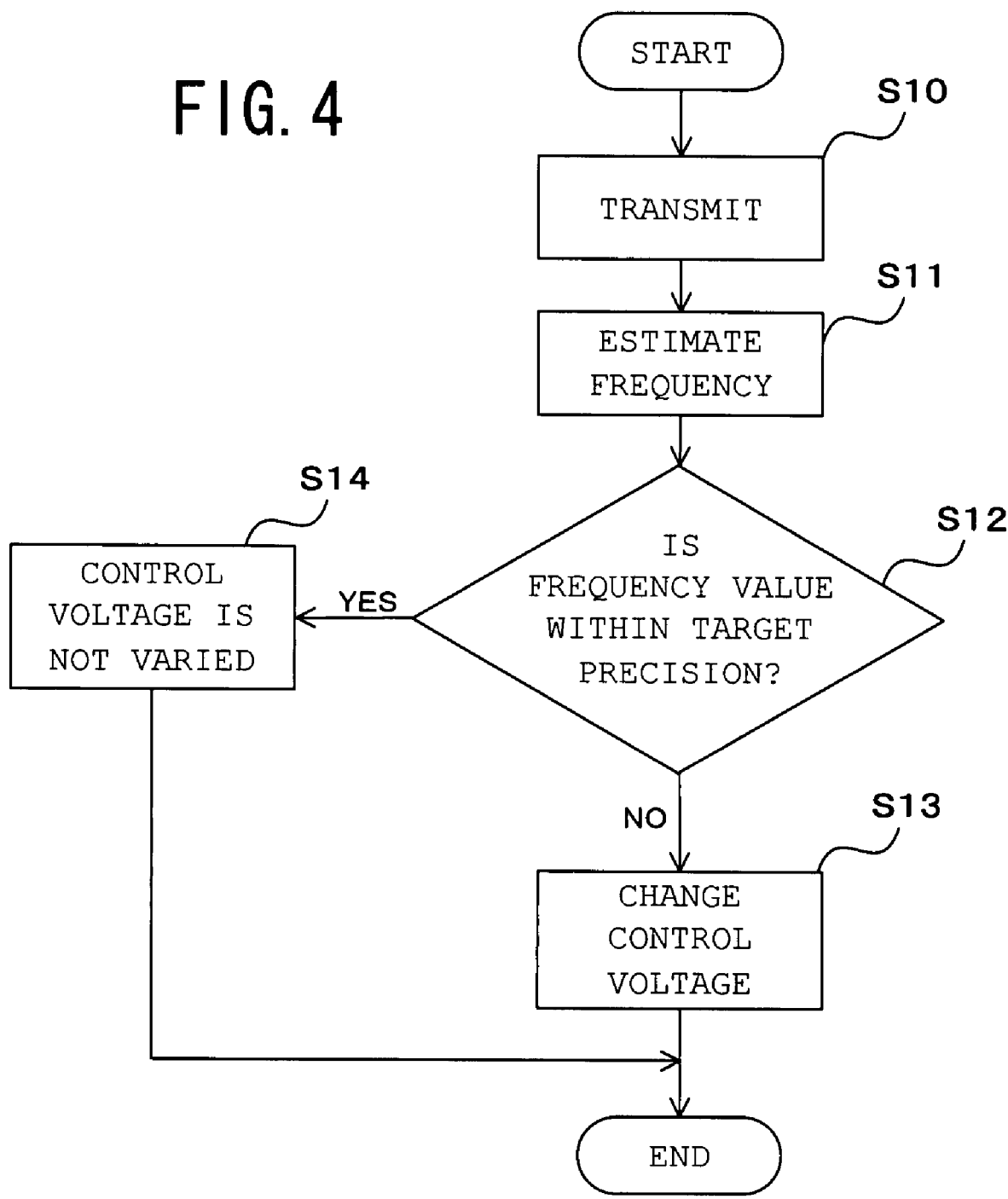
FIG. 4 is a flowchart of the first embodiment according to the present invention.

Here, the operation of the radar apparatus of the first embodiment will be described with reference to the flowchart of FIG. 4.

In step S10, the transmission operation of the radar apparatus is carried out. That is, a transmission trigger is applied to the magnetron 1, and pulse-shaped electric waves are transmitted in a desired direction from the antenna 3.

In step S11, the signal extracting unit 12 extracts the frequency estimation signal corresponding to the main bang from the signal which is output from the transmission/reception switching unit 2 to the receiving unit, and the frequency is estimated in the frequency estimating unit 14.

In step S12, it is judged by the frequency controller 15 whether the frequency estimated in the frequency estimating unit 14 is within a predetermined range (for example, from 58 MHz to 62 MHz).

In step S13, the frequency controller 15 changes the control voltage applied to the local oscillator 5 on the basis of the frequency estimated in the frequency estimating unit 14. Specifically, for example, the difference between the target frequency and the estimated frequency is divided by the gradient of the VCO characteristic to achieve the voltage differential value, and the value achieved by adding or subtracting the voltage differential value to or from the previous control voltage is applied to the local oscillator 5.

In step S14, the frequency controller 15 executes the control of continuing to apply the same control voltage to the local oscillator 5.

With respect to the gradient of the VCO characteristic, a predetermined value is stored as a default value in the frequency controller 15 at the shipping time of the radar apparatus. However, there are problems such as the individual difference of respective elements mounted in the radar apparatus, the characteristic variation caused by temperature variation of elements during the operation of the radar apparatus, secular variation, etc. Therefore, it is desirable to properly correct the gradient of the VCO characteristic function on the basis of the actual measurement.

A method of correcting the gradient of the VCO characteristic stored in the frequency controller 15 on the basis of the actual measurement will be described hereunder.

First, a first radar detecting operation is carried out under the condition that the control voltage applied to VCO is set to V1. At this time, it is assumed that the frequency of the frequency estimation signal is estimated as F1. Subsequently, a second radar detecting operation is carried out under the condition that the control voltage applied to VCO is set to V2. At this time, the frequency of the frequency estimation signal is estimated as F2. On the basis of the two radar detecting operations which are carried out while the voltage applied to VCO is changed, the gradient of the VCO characteristic in the frequency controller 15 may be changed to (F1−F2)/(V1−V2).

This method is based on the assumption that the oscillation frequency of the magnetron is not varied between the two actual measurements. It is desirable that these two actual measurements are sequentially carried out under the state that the oscillation of the magnetron is stable.

With respect to the calibration as described above, it may be carried out every fixed time or it may be carried out as a calibration mode by user's manual control. Furthermore, it may be carried out when the radar apparatus is powered on.

In the first embodiment of the present invention, the multiplexer 9 and the signal extracting unit 12 are provided so that A/D conversion is carried out by one A/D converter. However, two A/D converters 11 may be provided so that two type signals of the detection signal and the non-detection signal are processed in parallel. The extraction of main bang may be carried out in the frequency estimating unit 14.

Second Embodiment

The oscillation frequency of the magnetron is generally unstable. Particularly when the oscillation of the magnetron is started at the power-on time of the radar apparatus or when the transmission pulse length is changed to change the detection range, the oscillation frequency becomes an extremely high frequency or low frequency. Furthermore, even when the radar apparatus operates normally, there may be a case that the frequency estimated by the frequency estimating unit 14 is greatly displaced from the target value of the frequency of the IF signal due to variation of the oscillation state of the magnetron in the radar apparatus of the first embodiment, so that the frequency concerned is greatly out of the frequency range which can be processed by the frequency estimating unit 14. The construction of a radar apparatus adaptable to such a case will be described as a second embodiment.

In the radar apparatus of the second embodiment, two modes of a rough-tuning mode and a fine-tuning mode are provided, and one of these two modes is selectively used in accordance with the situation. For example, the fine-tuning mode is used when the frequency is relatively stable, and the rough-tuning mode is used when the frequency is unstable. The change of the two operation modes may be manually carried out, however, in this embodiment, it is assumed that the operation modes are automatically changed.

Figure 5:
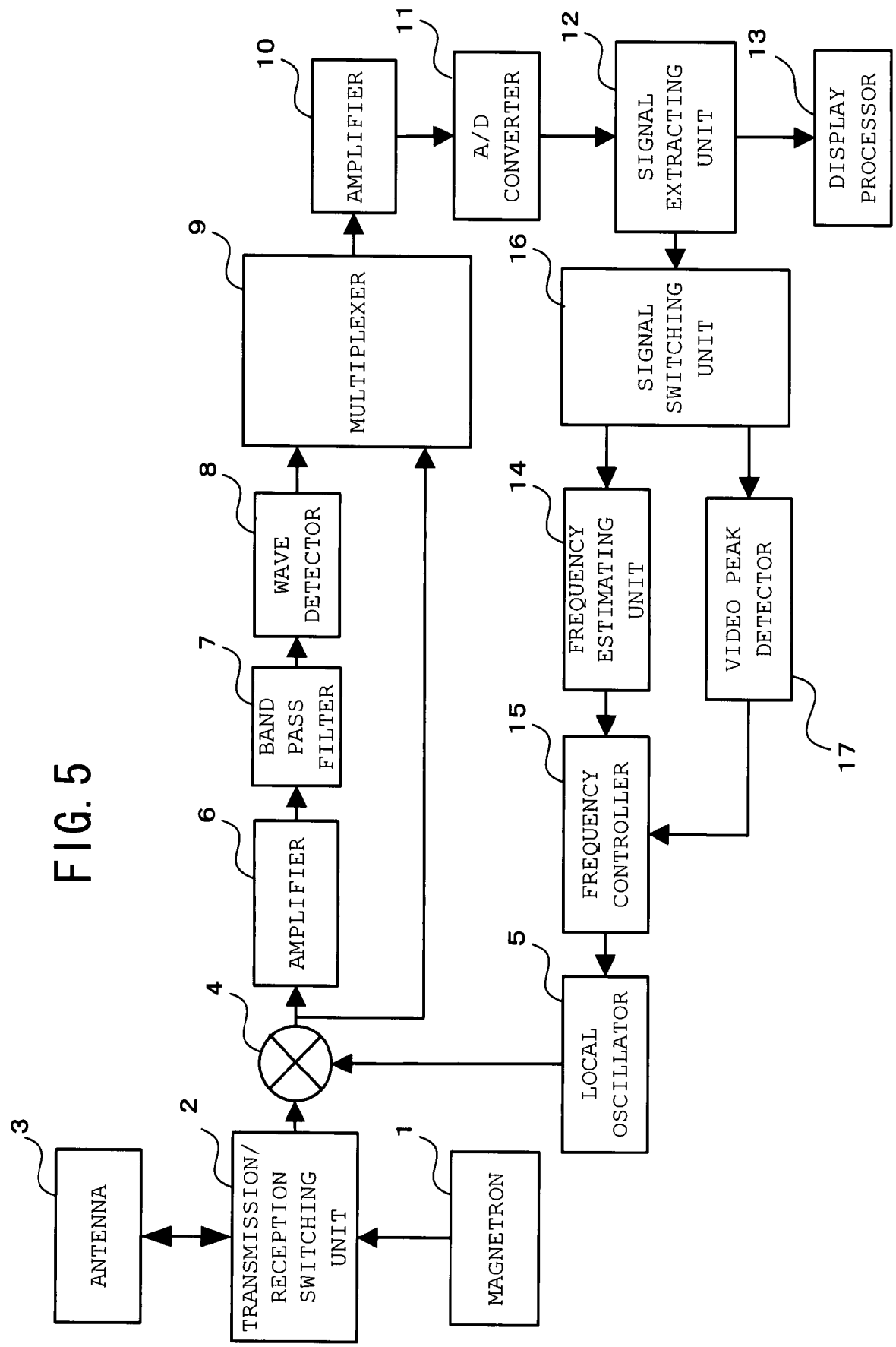
FIG. 5 is a block diagram showing a second embodiment according to the present invention.

FIG. 5 is a block diagram showing the construction of the second embodiment. In the construction of the second embodiment, a signal switching unit 16 and a video peak detector 17 are added to the construction of the first embodiment.

The second embodiment will be described hereunder with reference to the block diagram of FIG. 5.

In FIG. 5, the magnetron 1 for generating a high-frequency signal (a high-frequency signal of about 9410 MHz, for example) is connected to the antenna 3 through the transmission/reception switching unit 2, and pulse-shaped electric waves are successively transmitted in each direction from the antenna 3 in synchronism with a transmission trigger ((a) of FIG. 2). The transmitted electric waves are reflected from a target existing in the transmission direction of the electric waves, and received by the antenna 3. The reception signal received by the antenna 3 is guided to the mixer 4 through the transmission/reception switching unit 2, and combined with a local oscillation signal (a signal of about 9470 MHz, for example) from the local oscillator 5 connected to the mixer 4, thereby outputting an IF signal of an intermediate frequency band (in this case, a signal of about 60 MHz, (b) of FIG. 2). VCO is used as the local oscillator 5.

The IF signal output from the mixer 4 is split to two parts of two systems. One part is passed through the amplifier 6, the band pass filter 7 and the detector 8 to the multiplexer 9, and the other part is directly input to the multiplexer 9. In the band pass filter 7, signals other than the signal of the frequency (in this case, a signal of about 60 MHz) in the vicinity of the frequency band which a display signal should have are removed.

The construction and the operation described above are common to both the operation modes of the fine-tuning mode and the rough-tuning mode.

The signal flow after the signal is input to the multiplexer 9 is different between the fine-tuning mode and the rough-tuning mode, and it will be described hereunder in turn.

First, the signal flow in the case of the fine-tuning will be described.

As a general rule, the tuning processing in the radar apparatus of the present invention is executed in the fine-tuning mode described below. The rough-tuning mode is intermittently executed at the execution timing of the rough-tuning described later.

In the fine-tuning mode, the multiplexer 9 is controlled by the control signal ((c) of FIG. 2) synchronized with the transmission trigger, and generates a composite signal ((d) of FIG. 2) comprising a non-detected portion (carrier signal) corresponding to the main bang signal in the IF signal and a detected portion (video signal) other than the main bang signal, the former portion and the latter portion being time-divisionally combined with each other. This composite signal is amplified in the amplifier 10, sampled and converted to a digital signal in the subsequent A/D converter 11, and then divided to two signals of the frequency estimation signal as the digital signal corresponding to the main bang signal and the display signal again in the signal extracting unit 12. The control signal of the signal extracting unit 12 is shown in (f) of FIG. 2. The display signal is processed in the display processor 13, and the detection picture of the target is displayed. The construction of the signal extracting unit 12 is the same as described in the first embodiment.

The frequency estimating signal is input to the signal switching unit 16. When the radar apparatus is operated in the fine-tuning mode, the signal switching unit 16 outputs the frequency estimating signal to the frequency estimating unit 14. In the frequency estimating unit 14, the frequency of the frequency estimation signal is estimated in the same procedure as described in the first embodiment, and the frequency value is output to the frequency controller 15.

In the frequency controller 15, the control voltage applied to the local oscillator 5 is adjusted on the basis of the frequency value of the frequency estimation signal from the frequency estimating unit 14 and the stored gradient of the VCO characteristic of the local oscillator 5 so that the frequency of the IF frequency output from the mixer 4 approaches to a fixed value.

The rough-tuning mode will be described hereunder.

The execution timing of the rough-tuning will be first described. The rough-tuning mode is executed just after the power is turned on or just after the detection range is changed, or when the radar apparatus is operated in the five-turning mode and it is judged that the adjustment of the local oscillation frequency based on the rough-turning mode is necessary in the frequency estimating unit 14. In the frequency estimating unit 14, the judgment that the adjustment based on the rough-tuning mode is required is made under various conditions such as a condition that the frequency value of the frequency estimation signal estimated by the frequency estimating unit 14 is deviated from a predetermined frequency range (first frequency range) which is set in advance, for example, the range from 40 MHz to 80 MHz, a condition that the frequency value of the IF signal estimated in the frequency estimating unit 14 is severely fluctuated, etc.

When the mode is switched from the fine-tuning mode to the rough-tuning mode, a command signal is output from the frequency estimating unit to the signal switching unit 16 so that the frequency estimation signal is output to the video peak detector 17, and the operation mode of the radar apparatus is changed to the rough-tuning mode.

Next, the processing content of the rough-tuning mode will be described. When the operation mode of the radar apparatus is switched to the rough-tuning mode, the radar transmitting/receiving operation is carried out at plural times while the control voltage applied to the local oscillator 5 by the frequency controller 15 is successively changed every transmission.

The flow of the signal until the signal is input to the multiplexer 9 is common between the rough-tuning mode and the fine-tuning mode, and thus the description thereof is omitted. Accordingly, the description will be made from the processing of the multiplexer 9.

In the rough-tuning mode, the multiplexer 9 is controlled to be connected to the wave detector 8 side unlike the fine-tuning mode. Therefore, the composite signal in the rough-tuning mode is the signal detected over the whole period. The composite signal output from the multiplexer 9 is amplified by the amplifier 10, and then sampled and converted to a digital signal with a predetermined sample clock signal ((e) of FIG. 2) in the subsequent A/D converter 11. Thereafter, the digital signal thus achieved is split to two signals of a frequency estimating signal as the digital signal corresponding to a main bang signal and a display signal. The control signal of the signal extracting unit 12 is shown in (f) of FIG. 2. The display signal is processed in the display processor 13, and the detection picture of the target is displayed.

The frequency estimation signal output from the signal extracting unit 12 is input to the video peak detector 17 by the signal switching unit 16.

The video peak detector 17 successively detects and stores the intensity of the frequency estimation signal over the plural radar detecting operations which are executed while successively changing the control voltage applied to the local oscillator 5, determines the control voltage of the local oscillator 5 which provides the maximum intensity, and outputs the control voltage concerned to the frequency controller 15. Here, with respect to the intensity of the frequency estimation signal, the maximum value of the frequency estimation signal may be used, or the integration value of the intensities of the frequency estimation signals which are beyond a predetermined threshold value may be used.

When the control voltage of the local oscillator 5 which provides the maximum intensity to the frequency estimation signal is determined in the video peak detector 17, the video peak detector 17 outputs the determined control voltage as a final control voltage to the frequency controller 15, and the operation of the radar apparatus is shifted to the fine-tuning mode.

With respect to the rough-tuning mode, other well-known tuning techniques such as the method disclosed in Patent Document 1, etc. may be used.

Figure 6:
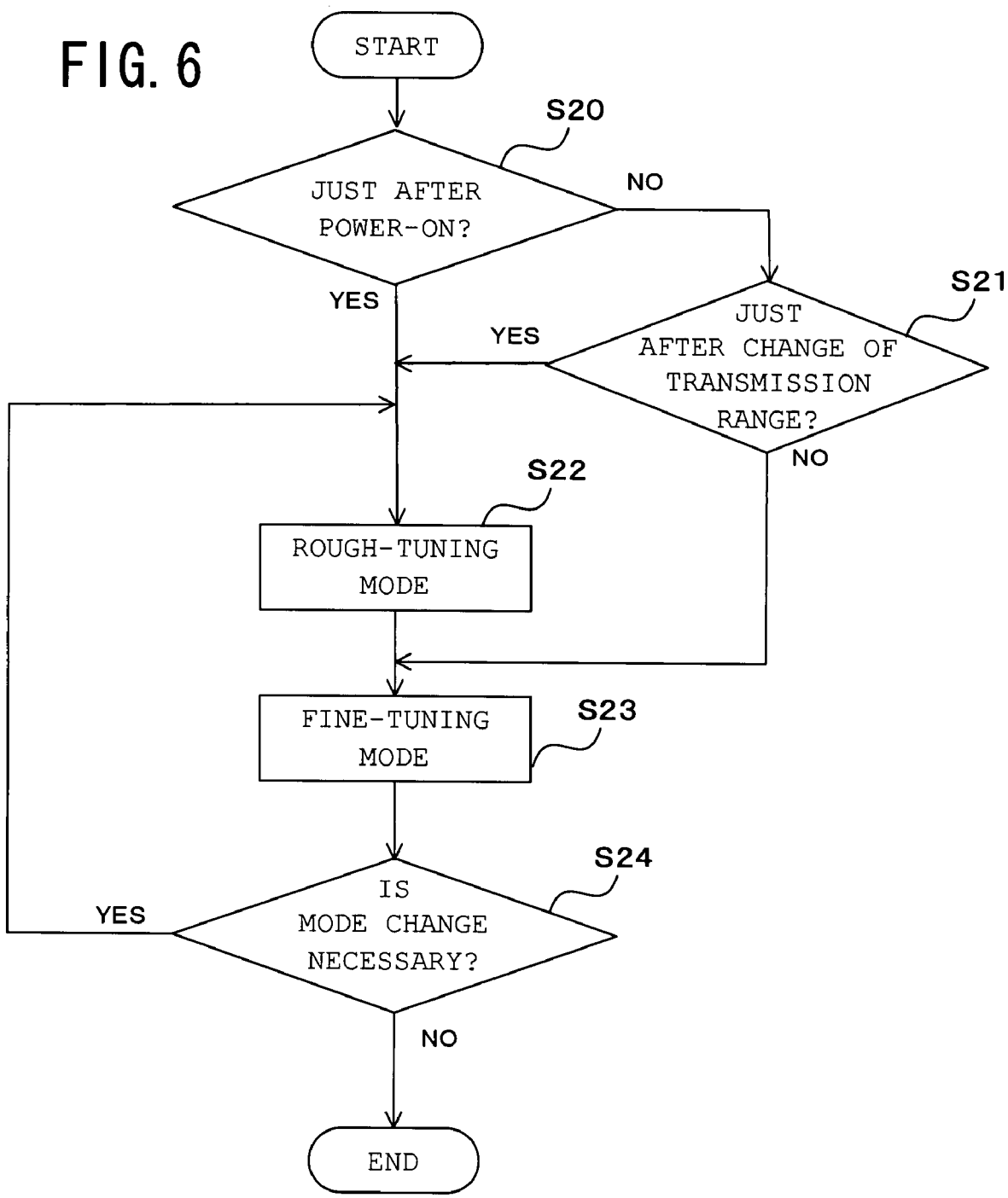
FIG. 6 is a flowchart of the second embodiment according to the present invention.
Figure 7:
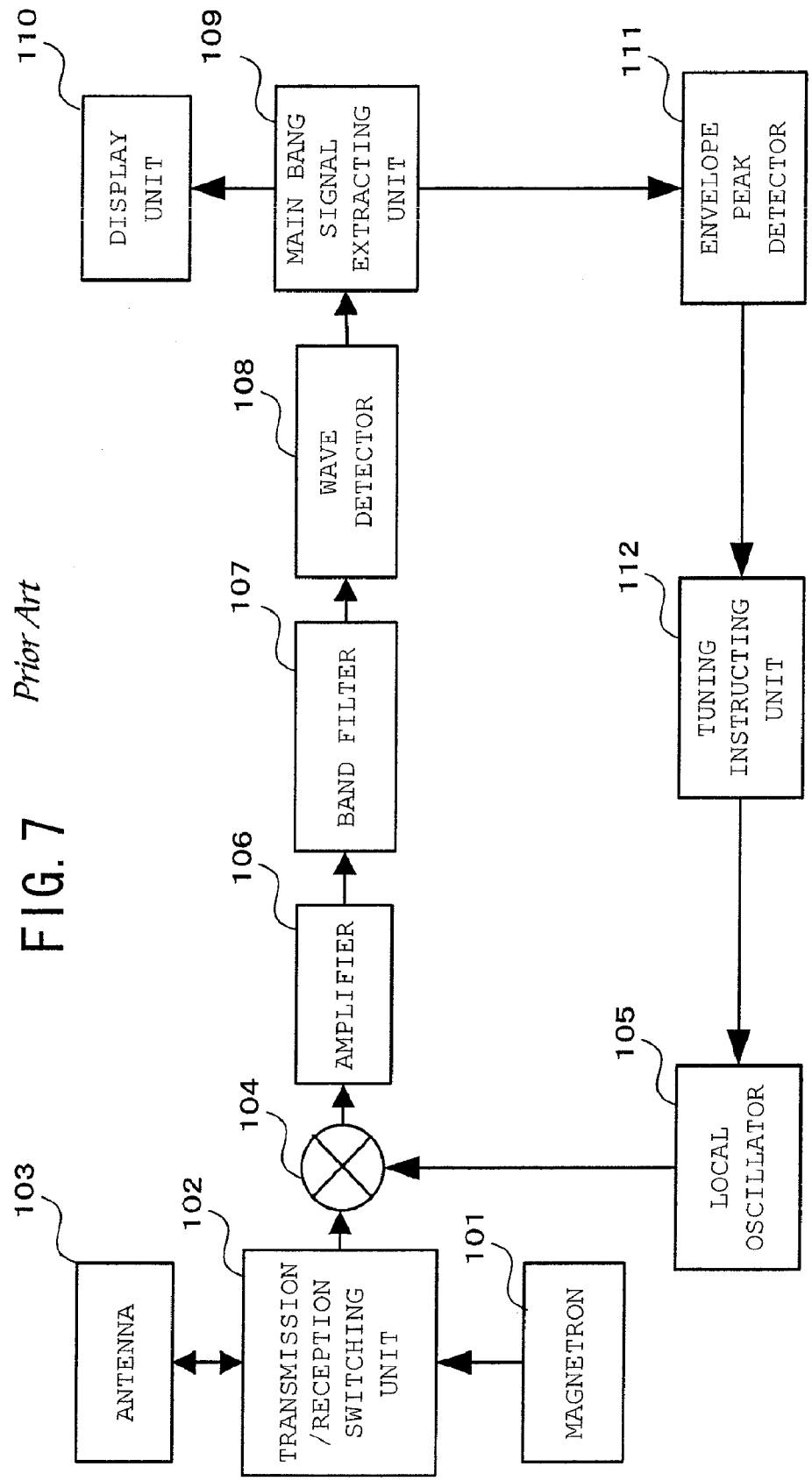
FIG. 7 is a block diagram showing a conventional radar apparatus.

Here, the mode change in the operation of the radar apparatus according to the second embodiment will be described with reference to the flowchart of FIG. 6.

In step S20, it is judged whether it is just after the radar apparatus is powered on. The oscillation frequency of the magnetron is unstable just after the power-on of the radar apparatus, and thus it is preferable that the tuning is carried out in the rough-tuning mode.

In step S21, it is judged whether it is just after the detection range of the radar apparatus is changed. In connection with the change of the radar transmission range, the pulse length of the transmission pulse generated by the magnetron is changed, and thus the variation of the frequency of the magnetron is severe. In such a case, it is preferable to carry out the tuning based on the rough-tuning mode. This step may be omitted.

In step S22, the operation based on the rough-tuning mode is executed. That is, the radar detecting operation is executed at plural times while the control voltage applied to the local oscillator 5 is successively varied. In each operation, the video peak detector 17 successively detects and stores the intensity of the main bang signal which is extracted and detected from the IF signal, determines the control voltage of the local oscillator 5 at which the intensity is maximum, and outputs the control voltage concerned to the frequency controller 15. With respect to the rough-tuning mode, once it is executed, the rough-tuning mode is automatically shifted to the fine-tuning mode. However, just after the mode is shifted to the fine-tuning mode, the frequency controller 15 applies the control voltage providing the maximum intensity to the main bang signal to the local oscillator 5, and starts the detecting operation. Particularly when the oscillation of the magnetron 1 is unstable just after power-on or the like, the rough-tuning mode may be sequentially executed at a predetermined number of times. In this case, the average value of control voltages which are determined over a predetermined number of times may be used as the final control voltage.

In step S23, the operation of the fine-tuning mode is executed. The operation of the fine-tuning mode is substantially the same as the operation described with reference to the flowchart of FIG. 4. That is, the frequency of the portion corresponding to the main bang in the IF signal is estimated in the frequency estimating unit 14, and the control voltage applied to the local oscillator 5 is controlled by the frequency controller 15 so that the estimated frequency is substantially constant.

In step S24, during the execution of the fine-tuning mode, it is judged whether it is necessary to change the mode to the rough-tuning mode. That is, it is judged whether the frequency value of the frequency estimation signal estimated by the frequency estimating unit 14 is deviated from a predetermined frequency range (first frequency range), for example, the range from 40 MHz to 80 MHz and the frequency value of the IF signal estimated by the frequency estimating unit 14 varies severely. If it is judged from these judgment conditions that the mode change is necessary, the operation of the radar apparatus is shifted to the rough-tuning mode.

Finally, the method of correcting the target frequency set in the frequency controller 15 by using the control voltage of the local oscillator 5 which is determined in the rough-tuning mode will be described.

There is a case that the control voltage of the local oscillator 5 which is determined in the rough-tuning mode as providing the maximum intensity to the frequency estimation signal is not coincident with the control voltage corresponding to the target frequency which is stored in the frequency controller in advance. This is because the characteristic of the band pass filter 7 is different among radar apparatuses due to errors occurring in the manufacturing process, and thus the best detection image cannot be achieved when the operation of the fine-tuning mode is carried out under the state that the target value of the target frequency set as a default in the frequency controller 15 is directly used. The disadvantage as described above can be overcome by changing the target frequency to the frequency corresponding to the control voltage which is known as providing the maximum intensity to the frequency estimation signal as a result of the operation based on the rough-tuning mode.

Specifically, the control voltage of the local oscillator 5 is set to the control voltage of the local oscillator 5 which is determined in the video peak detector and provides the maximum intensity to the frequency estimation signal in the rough-tuning mode, and then the operation based on the fine-tuning mode is carried out. The frequency of the IF signal estimated at that time is set as a new target frequency in the fine-tuning mode. The operation based on the fine-tuning mode can be more suitably performed by carrying out the correction of the target frequency in the frequency controller 1 as described above after the operation based on the rough-tuning mode is carried out.

In this case, it is assumed that the oscillation frequency of the magnetron 1 is substantially identical at both the time point at which the control voltage of the local oscillator 5 providing the maximum intensity to the frequency estimation signal is determined, and the time point at which the control voltage is set to the best tuning voltage thus determined, the operation is carried out and the frequency is estimated in the frequency estimating unit. Therefore, the correction of the target frequency is desired to be carried out in a short time when the oscillation of the magnetron 1 is as stable as possible. For example, the correction may be executed just after the optimal control voltage of the local oscillator 5 is determined in the rough-tuning mode.

In the second embodiment of the present invention, the multiplexer 9 and the signal extracting unit 12 are provided, and the A/D conversion is carried out by one A/D converter 11. However, two A/D converters 11 may be provided so that the two types of signals of a detection signal and a non-detection signal are processed in parallel. Furthermore, the extraction of the main bang may be carried out in the frequency estimating unit 14, the video peak detector 17 or the signal switching unit 16. If the detection signal and the non-detection signal are processed in parallel, the control voltage of the local oscillator 5 which provides the maximum intensity to the frequency estimation signal and the correction value of the target frequency corresponding to the control voltage can be detected at the same time, and thus the correction value of the target frequency in the frequency controller 15 can be more surely achieved.

What is claimed is:

1. A radar apparatus comprising:
an antenna for transmitting electromagnetic waves and receiving reflection waves from a target;
a transmission/reception switching unit for supplying a high-frequency signal from a magnetron to the antenna and outputting a signal from the antenna;
a mixer for mixing a signal output from the transmission/reception switching unit with a local oscillation signal generated in a local oscillator and outputting an IF signal of an intermediate frequency band;
a band pass filter for filtering the IF signal;
a detector for detecting a signal output from the band pass filter and outputting a detection signal;
an A/D converter for converting the IF signal and the detection signal to digital signals;
a display processor for processing the detection signal output from the A/D converter and displaying a detection picture of the target;
a frequency estimating unit for estimating the frequency value of a carrier signal corresponding to main bang out of the IF signal output from the A/D converter by Fourier Transform;
a frequency controller for controlling a control voltage applied to the local oscillator on the basis of the frequency estimated in the frequency estimating unit so that the frequency of the IF signal output from the mixer approaches to a predetermined target frequency
a multiplexer for time-divisionally selecting a detection signal output from the wave detector and a non-detected IF signal output from the mixer, and outputting the selected signal to the A/D converter; and
a signal extracting unit for extracting the signal corresponding to the main bang from the output of the A/D converter, outputting the extracted signal to the frequency estimating unit and outputting the remaining signal or the output of the A/D converter to the display processor so that the IF signal and the detection signal are converted to digital signals by one A/D converter.

2. A radar apparatus comprising:
an antenna for transmitting electromagnetic waves and receiving reflection waves from a target;
a transmission/reception switching unit for supplying a high-frequency signal from a magnetron to the antenna and outputting a signal from the antenna;
a mixer for mixing a signal output from the transmission/reception switching unit with a local oscillation signal generated in a local oscillator and outputting an IF signal of an intermediate frequency band;
a band pass filter for filtering the IF signal;
a detector for detecting a signal output from the band pass filter and outputting a detection signal;
an A/D converter for converting the IF signal and the detection signal to digital signals;
a display processor for processing the detection signal output from the A/D converter and displaying a detection picture of the target;

a signal switching unit for selectively outputting the detection signal and the IF signal output from the A/D converter on the basis of a predetermined condition;

a video peak detector for receiving the detection signal output from the A/D converter, successively detecting and storing the intensity of the signal corresponding to main bang in the detection signal over plural transmission/reception cycles that are executed while successively changing a control voltage applied to the local oscillator, determining a control voltage applied to the local oscillator under which the intensity concerned is maximum, and outputting the control voltage concerned to a frequency controller;

a frequency estimating unit for receiving the IF signal output from the A/D converter, and estimating the frequency value of a carrier signal corresponding to main bang in the IF signal; and a frequency controller for controlling the control voltage applied to the local oscillator on the basis of the control voltage of the local oscillator detected by the video peak detector or the frequency estimated in the frequency estimating unit so that the frequency of the IF signal output from the mixer approaches to a predetermined target frequency.

3. The radar apparatus according to claim 2, wherein the signal switching unit outputs the detection signal output from the A/D converter when power is turned on, or when the frequency estimated by the frequency estimating unit is out of a first frequency range, or when the variation amount of the estimated frequency is over a predetermined permitted range.

4. The radar apparatus according to 3, wherein the signal switching unit switches the output thereof from the detection signal to the IF signal when the video peak detector determines the control voltage under which the intensity of the signal corresponding to the main bang in the detection signal is maximum.

5. The radar apparatus according to claim 2, further comprising:

a multiplexer for time-divisionally selecting a detection signal output from the detector and a non-detected IF signal output from the mixer, and outputting the selected signal to the A/D converter; and a signal extracting unit for extracting the signal corresponding to the main bang from the output of the A/D converter, outputting the extracted signal to the signal switching unit and outputting the remaining signal or the output of the A/D converter to the display processor so that the IF signal and the detection signal are converted to digital signals by one A/D converter.

6. The radar apparatus according to claim 2, wherein the frequency controller is designed so that the control voltage applied to the local oscillator is not varied when the frequency value from the frequency estimating unit is contained in a second frequency range in the neighborhood of the target frequency.

7. The radar apparatus according to claims 2, wherein the frequency controller corrects the target frequency on the basis of the frequency of the IF signal under application of the control voltage of the local oscillator that provides the maximum value to the intensity of the signal corresponding to the main bang in the detection signal and is detected by the video peak detector.

8. The radar apparatus according to claims 2, wherein the frequency controller calibrates the relationship between the control voltage of the local oscillator and the oscillation frequency on the basis of the frequency estimated by the frequency estimating unit when a different control voltage is applied to the local oscillator.

9. The radar apparatus according to claim 1, wherein the frequency estimating unit estimates the frequency on the basis of the maximum spectrum achieved by subjecting a carrier signal corresponding to main bang in the IF signal to Discrete Fourier Transform and spectra in the neighborhood of the maximum spectrum.

10. The radar apparatus according to claim 1, wherein the frequency estimating unit outputs to the frequency controller a frequency value which is subjected to averaging processing over plural radar detecting operations.

* * * * *